May 29, 1973     K. G. BLANDFORD     3,736,191

METHOD OF PROVIDING A TERMINAL ON AN ELECTRIC STORAGE BATTERY

Filed March 30, 1971

INVENTOR

Kenneth George Blandford

Holman & Stern

ATTORNEYS 3,736,191
METHOD OF PROVIDING A TERMINAL ON AN ELECTRIC STORAGE BATTERY
Kenneth George Blandford, 1270 Yardley Wood Road, Solihull, England
Filed Mar. 30, 1971, Ser. No. 129,455
Claims priority, application Great Britain, Apr. 11, 1970, 17,335/70
Int. Cl. H01m 5/00
U.S. Cl. 136—135 S        10 Claims

ABSTRACT OF THE DISCLOSURE

A method of providing a terminal on an electric storage battery comprises starting with a conductive lug having an aperture therein and locating the lug in contact with the inner surface of a side or end wall of the battery box so that an integral extension of the lug engages a conductive bar, the conductive bar interconnecting sets of battery plates in a pair of adjacent cell compartments of the battery. The aperture in the lug communicates with, but is of smaller cross section than an aperture in the side or end wall of the battery so that the lug defines an inwardly extending shoulder presented to the aperture in the side or end wall, and a terminal support member is engaged in the aperture in the lug. The support member defines an outwardly extending shoulder and an annular conductive washer is located in the aperture in the side or end wall so that one face of the washer abuts against the shoulders on the lug and the support member respectively. A seal is effected between the washer and the lug to trap the support member therebetween, a terminal is engaged with the support member, and an electrical connection is provided from the terminal through the lug to the conductive bar.

---

This invention relates to a method of providing a terminal on an electric storage battery of the kind including a battery box having side walls and end walls, the box being divided into a plurality of cell compartments by a plurality of partition walls, and a plurality of battery plates in each cell compartment, sets of plates in each cell compartment being connected to respective conductive bars and sets of plates in adjacent cell compartments being interconnected through said bars.

A method according to the invention comprises starting with a conductive lug having an aperture therein, locating said lug in contact with the inner surface of a side or end wall of the battery box so that an integral extension of said lug engages one of said conductive bars, said aperture in the lug communicating with, but being of smaller cross-section than, an aperture in said side or end wall so that said lug defines an inwardly extending shoulder presented to the aperture in the side or end wall, engaging a terminal support member in the aperture in said lug, said support member defining an outwardly extending shoulder, locating an annular conductive washer in said aperture in the side or end wall so that one face of the washer abuts against said shoulders on the lug and on the support member respectively, effecting a seal between the washer and lug to trap said support member therebetween, engaging a terminal with said support member, and providing an electrical connection from the terminal through said lug to said conductive bar.

Preferably, the aperture in said lug is non-circular and the terminal support member is arranged to be complementary with the aperture so that relative rotation between the support member and the lug is prevented.

Conveniently, said terminal support member is formed from a non-conductive synthetic resin material and said terminal is engaged with said terminal support member so that a portion of the terminal engages the conductive washer and the electrical connection from the terminal to said conductive bar is made through said washer and said lug.

Figure 1:
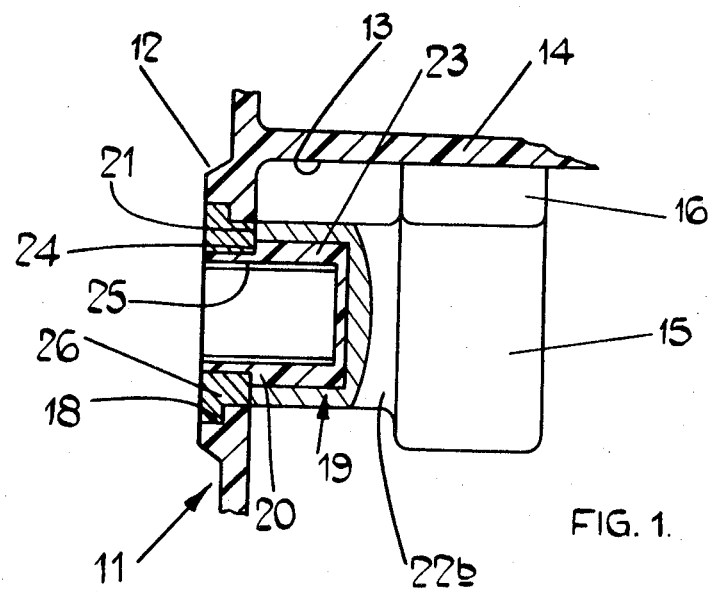
Figure 2:
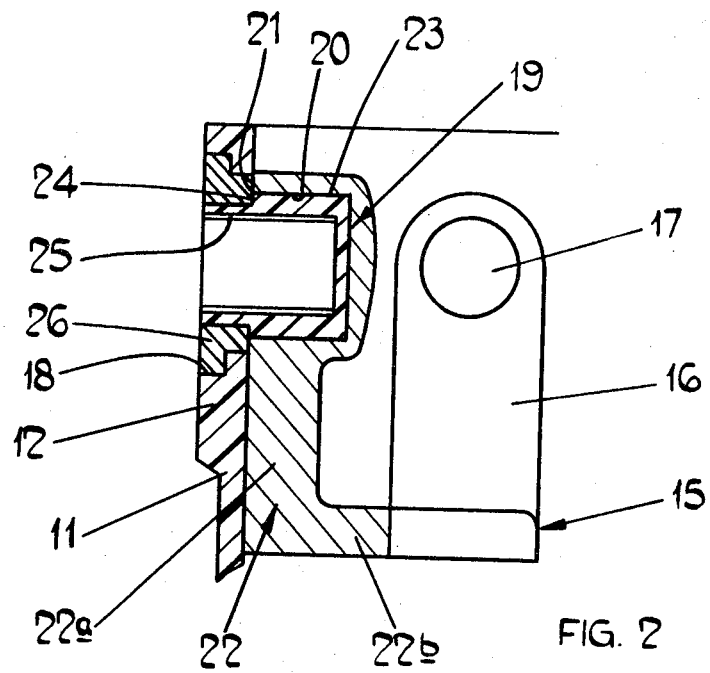

In the accompanying drawings:

FIG. 1 is a sectional plan view of part of an electric storage battery at one stage during a method according to one example of the invention, and FIG. 2 is a sectional side elevational view of FIG. 1.

Referring to the drawings, an electric storage battery includes a moulded synthetic battery box 11 having side walls 12 and end walls (not shown). The box 11 is divided into a plurality of cell compartments 13 by a plurality of partition walls 14 and a plurality of positive and negative battery plates (not shown) are assembled in each cell compartment. In batteries of this kind the set of positive battery plates in each cell compartment 13 are connected to the set of negative battery plates in an adjacent compartment and to enable completion of the inter-cell connections the sets of plates in each cell compartment are connected to respective lead connecting bars 15. Each bar 15 is formed with an integral extension 16 and the extensions 16 are each formed with an integral projection 17. Then to interconnect the required battery plates in a pair of adjacent cell compartments the integral projection 17 on each extension 16 is pressed into an aperture in the appropriate partition wall 14 and the projections are welded together, preferably by resistance welding. It is, of course, to be appreciated that one set of the battery plates in the end compartments of the box 11 are connected to the terminals respectively (not shown) of the battery.

In order to provide an extra terminal on the battery, one of the side walls 12 of the battery is formed with an aperture 18, which in the example shown is stepped. A lead lug 19 is positioned on the inner surface of the wall 12 adjacent the aperture 18 so that an aperture 20 in the lug 19 communicates with the aperture 18. The aperture 20 is, however, of smaller cross-section than the aperture 18 so that the lug 19 defines an inwardly extending, peripheral shoulder 21 presented to the aperture 18. The lead lug 19 also includes an integral L-shaped extension piece 22, one limb 22a of the extension piece 22 extending along the wall 12 and the other limb 22b extending at right angles to the wall 12 to engage one of the conductive bars 15. A terminal support member 23 is engaged at one end in the aperture in the lug 19 and at its other end projects into the aperture 18. The member 23 also presents to the aperture 18 an outwardly directed peripheral shoulder 24 when the member 23 is engaged with the lug 19. Further the member 23 is provided at its end remote from the lug 19 with a screw-threaded bore 25. The member 23 is, in the example shown, formed as a non-conductive synthetic resin moulding, but could alternatively be in the form of a metal casting.

The arrangement of the members 23 is such that, when engaged with the lug 19, the shoulder 24 is co-planar with or is positioned slightly below the shoulder 21 on the lug 19 so that an annular space is defined between the sides of the stepped aperture 18 and the member 23 and extends from the outer face of the wall 12 to the shoulders 21, 24. A stepped, annular lead washer 26 is engaged in the annular space between the member 23 and the sides of the aperture 18, one stepped face of the washer abutting against the shoulders 21, 24 and the other face of the washer defining part of the side wall 12 of the battery box. The washer 26 is then welded to the lug 19, for example by resistance welding, so as to trap the member 23 therebetween, and an externally screw threaded terminal piece (not shown) is engaged in the bore 25 in the terminal support member. The terminal piece is formed with an integral annular flange which abuts against the washer 26 when the terminal piece is fully engaged in the bore 25 and thereby serves to provide an electrical connection from the terminal piece through the lug 19 and the washer 26 to the respetcive lead bar 15.

Preferably, the aperture in the lug 19 is arranged to be non-circular and/or serrated so that when a conplementary terminal support member 23 is engaged therein, relative rotation between the lug 19 and the member 23 is prevented. Also the stepped aperture 18 may be non-circular and/or serrated, with the washer 26 being complementarily shaped.

While the particular example described has been concerned with providing an extra terminal to the two main terminals of the battery, it is to be appreciated that one or both of the two main terminals could, if required, be brought through the side or end walls of the battery box by the method described.

Having thus described my invention what I claim as new and desire to secure by Letters Patent is:

1. A method of providing a terminal on an electric storage battery of the kind including a battery box having side walls and end walls, the box being divided into a plurality of cell compartments by a plurality of partition wells, and a plurality of battery plates in each cell compartment, sets of plates in each cell compartment being connetced to respective conductive bars and sets of plates in adjacent cell compartment being interconnected through said bars, the method comprising starting with a conductive lug having an aperture therein, locating said lug in contact with the inner surface of a side or end wall of the battery box so that an integral extension of said lug engages one of said conductive bars, said aperture in the lug communicating with, but being of smaller cross-section than, an aperture in said side or end wall so that said lug defines an inwardly extending shoulder presented to the aperture in the side or end wall, engaging a terminal support member in the aperture in said lug, said support member defining an outwardly extending shoulder, locating an annular conductive washer in said aperture in the side or end wall so that one face of the washer abuts against said shoulders on the lug and on the support member respectively, effecting a seal between the washer and lug to trap said support member therebetween, engaging a terminal with said support member, and providing an electrical connection from the terminal through said lug to said conductive bar.

2. A method as claimed in claim 1 wherein the aperture in said lug is non-circular and the terminal support member is arranged to be complementary with the aperture so that relative rotation between the support member and the lug is prevented.

3. A method as claimed in claim 1 wherein the wall of the aperture in the lug is serrated.

4. A method as claimed in claim 1 wherein the aperture in the end or side wall of the battery box is stepped.

5. A method as claimed in claim 1 wherein the aperture in the end or side wall of the battery box is non-circular.

6. A method as claimed in claim 1 wherein the wall of the aperture in the end or side wall of the battery box is serrated.

7. A method as claimed in claim 1 wherein said terminal support member is formed from a non-conductive synthetic resin material and said terminal is engaged with said terminal support member so that a portion of the terminal engages the conductive washer and the electrical connection from the terminal to said conductive bar is made through said washer and said lug.

8. A method as claimed in claim 1 wherein the terminal support member is formed of metal so that the electrical connection from the terminal to said conductive bar is made through said terminal support member and said lug.

9. A method as claimed in claim 1 wherein the washer is sealed to the lug by resistance welding.

10. A method as claimed in claim 1 wherein said terminal support member is formed with a screw-threaded bore and said terminal is provided with a complementary, externally screw-threaded portion for engaging the terminal in the bore.

References Cited

UNITED STATES PATENTS

| 3,285,785 | 11/1966 | Shannon | 136—168 |
| 3,309,235 | 3/1967 | Teeple | 136—135 S |
| 3,607,441 | 9/1971 | Mix | 136—135 S |

DONALD L. WALTON, Primary Examiner

U.S. Cl. X.R.

136—168, 176